United States Patent
Lee et al.

(10) Patent No.: US 7,839,631 B2
(45) Date of Patent: Nov. 23, 2010

(54) COMPUTER ENCLOSURE WITH AIRFLOW-GUIDING DEVICE

(75) Inventors: Sheng-Hung Lee, Taipei Hsien (TW); Chien-Shun Lin, Taipei Hsien (TW); Li-Ping Chen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 204 days.

(21) Appl. No.: 12/327,628

(22) Filed: Dec. 3, 2008

(65) Prior Publication Data
US 2010/0002372 A1   Jan. 7, 2010

(30) Foreign Application Priority Data
Jul. 7, 2008   (CN) .................. 2008 2 0301460

(51) Int. Cl.
*H05K 7/20* (2006.01)
*A47B 77/08* (2006.01)
*H05K 5/00* (2006.01)
(52) U.S. Cl. ........................ 361/679.49; 361/679.51; 361/695; 312/236; 454/184
(58) Field of Classification Search ............ 361/679.49, 361/679.51; 312/236; 454/184
See application file for complete search history.

(56) References Cited

U.S. PATENT DOCUMENTS

| 5,338,214 | A | * | 8/1994 | Steffes et al. ............... 439/160 |
| 6,215,659 | B1 | * | 4/2001 | Chen .......................... 361/695 |
| 6,244,953 | B1 | * | 6/2001 | Dugan et al. ................ 454/184 |
| 6,400,568 | B1 | * | 6/2002 | Kim et al. ................... 361/697 |
| 6,871,879 | B2 | * | 3/2005 | Gan .......................... 285/189 |
| 7,289,323 | B2 | * | 10/2007 | Chang et al. ................ 361/695 |
| 7,408,773 | B2 | * | 8/2008 | Wobig et al. ................ 361/695 |
| 7,597,535 | B2 | * | 10/2009 | Wu et al. .................... 415/119 |
| 7,643,292 | B1 | * | 1/2010 | Chen .......................... 361/695 |
| 7,663,875 | B2 | * | 2/2010 | Lee et al. ............... 361/679.46 |
| 2008/0117589 | A1 | * | 5/2008 | Carrera et al. ............. 361/687 |
| 2009/0040717 | A1 | * | 2/2009 | Liu ............................ 361/695 |
| 2010/0097754 | A1 | * | 4/2010 | Li et al. ................. 361/679.49 |

* cited by examiner

*Primary Examiner*—Zachary M Pape
(74) *Attorney, Agent, or Firm*—Clifford O. Chi

(57) ABSTRACT

A computer enclosure includes a chassis and an airflow-guiding device mounted to the chassis. A receiving slot is defined in the chassis. An elastic receiving portion is formed around the receiving slot. One side of the airflow-guiding device is detachably fixed on the chassis. A first resilient securing member is formed on another side of the airflow-guiding device corresponding to the receiving slot. A wedge is formed on the first securing member to slide over the receiving portion and insert into the receiving slot.

12 Claims, 6 Drawing Sheets

COMPUTER ENCLOSURE WITH AIRFLOW-GUIDING DEVICE

BACKGROUND

1. Technical Field

The present invention relates to computer enclosures and, more particularly, to a computer enclosure with an airflow-guiding device.

2. Description of Related Art

Electronic components in a computer generate heat. Some electronic components require additional heat dissipation means such as airflow-guiding devices for guiding airflow to dissipate heat away from the electronic components. Typical airflow-guiding devices are usually fixed to the computer by bolts or screws. Installing the typical airflow-guiding devices with many receiving portions is laborious, time-consuming, and inconvenient.

What is needed, therefore, is a computer enclosure with an improved airflow-guiding device to overcome the above-described shortcomings.

DETAILED DESCRIPTION

Figure 1:
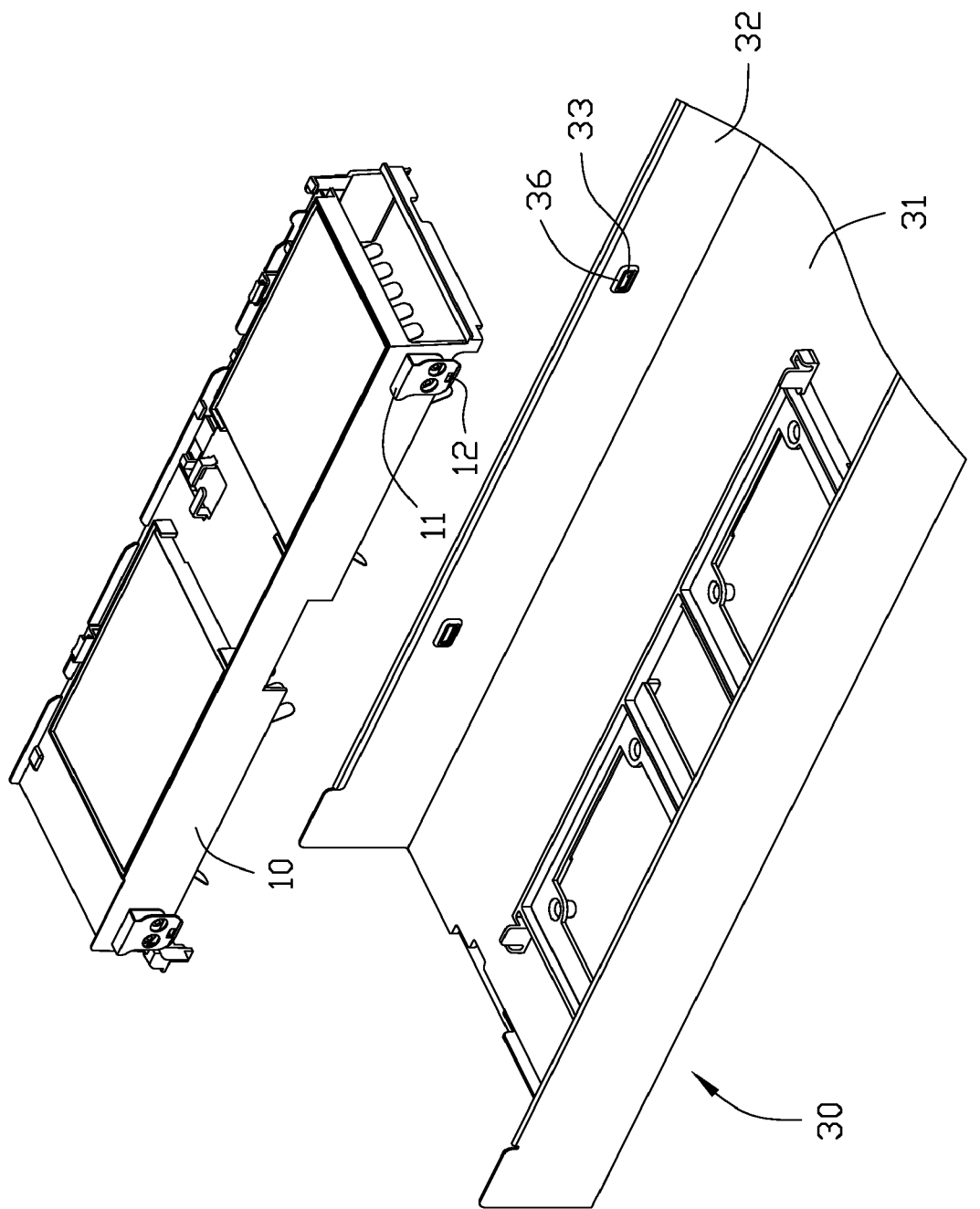
FIG. 1 is an exploded, isometric view of an embodiment of a computer enclosure with an airflow-guiding device.
Figure 2:
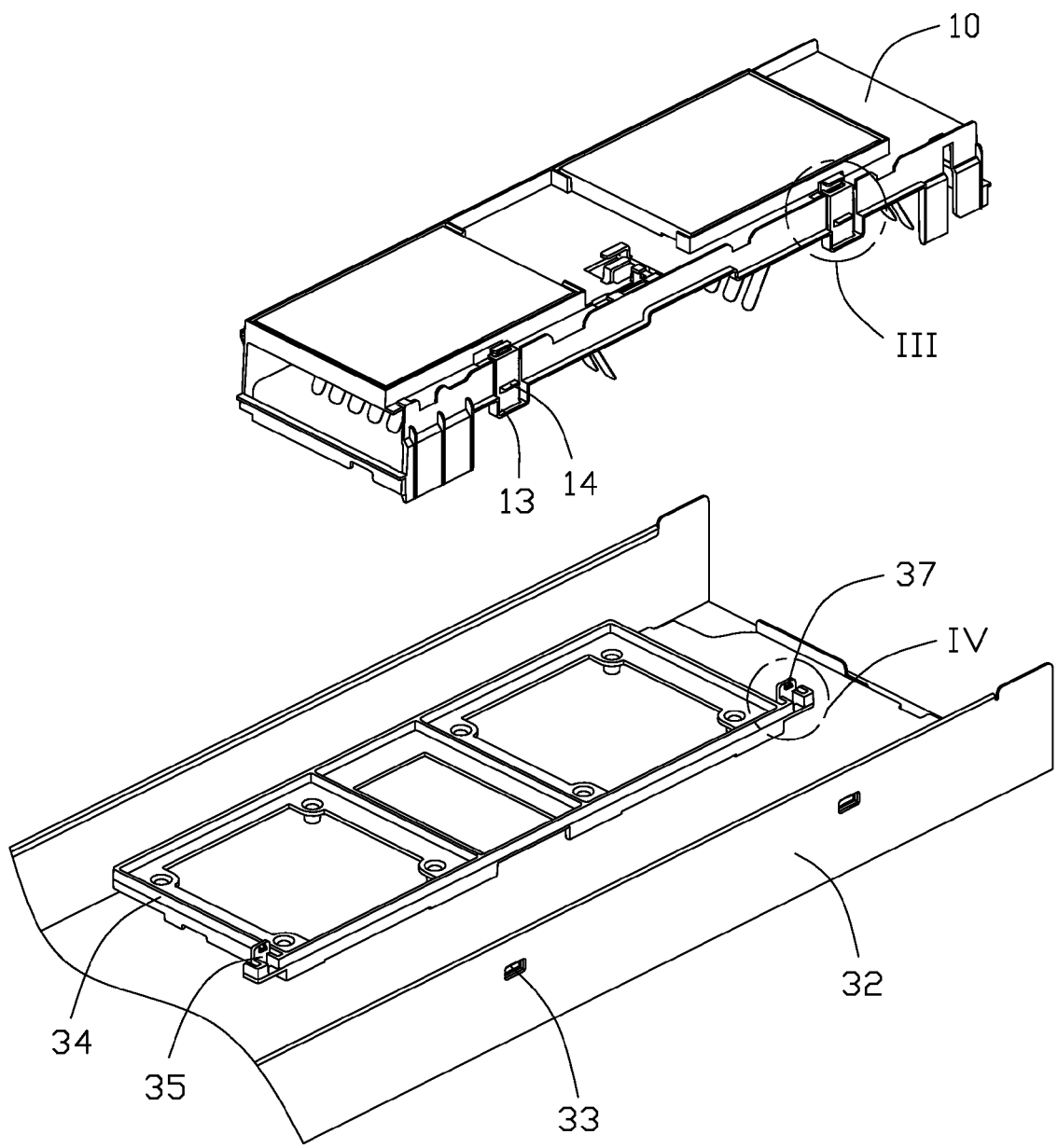
FIG. 2 is similar to FIG. 1, but viewed from another aspect.

Referring to FIG. 1 and FIG. 2, an embodiment of a computer enclosure with an airflow-guiding device includes an airflow-guiding device 10, and a chassis 30 to mount the airflow-guiding device 10 therein.

Figure 3:
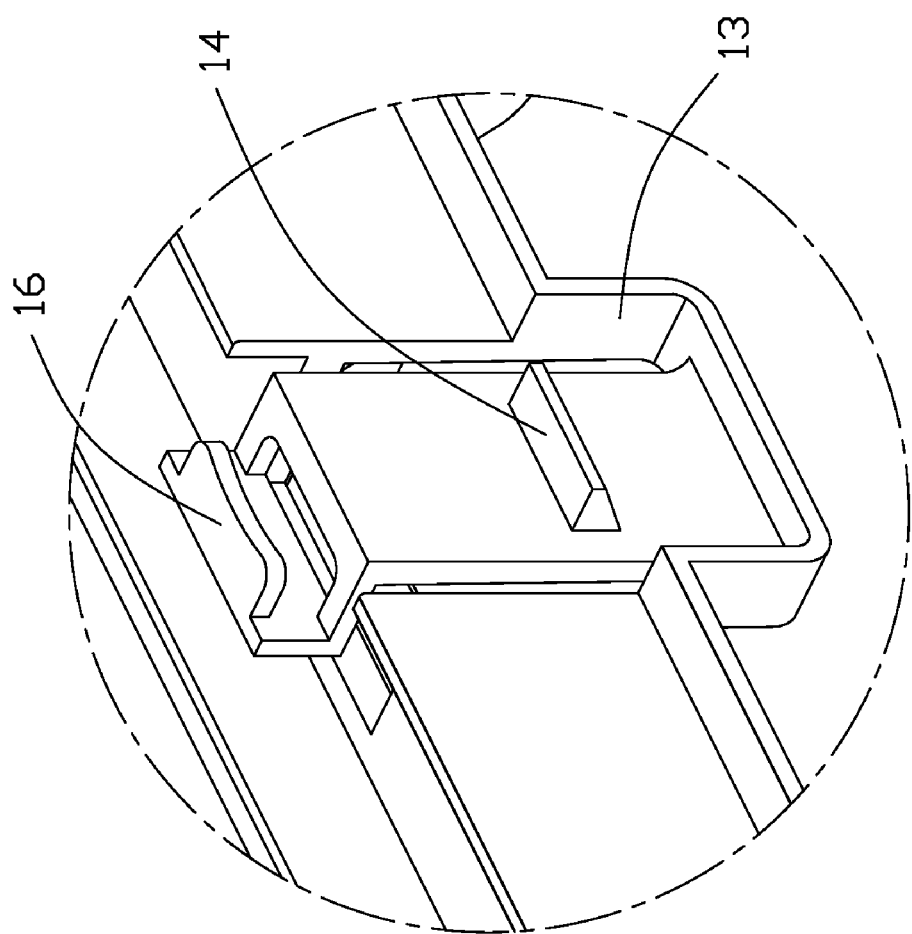
FIG. 3 is an enlarged isometric view of circled region III in FIG. 2.

Referring also to FIG. 3, a pair of clips 11 is formed on one side of the airflow-guiding device 10. Each clip 11 is bent approximately 180 degrees back upon itself from one side of the airflow-guiding device 10. A hole 12 is defined in a bottom portion of each clip 11. A pair of first resilient securing members 13 is formed on another side of the airflow-guiding device 10. A handle 16 is formed on a top of each first securing member 13. A wedge 14 extends from a middle portion of each first securing member 13.

Figure 4:
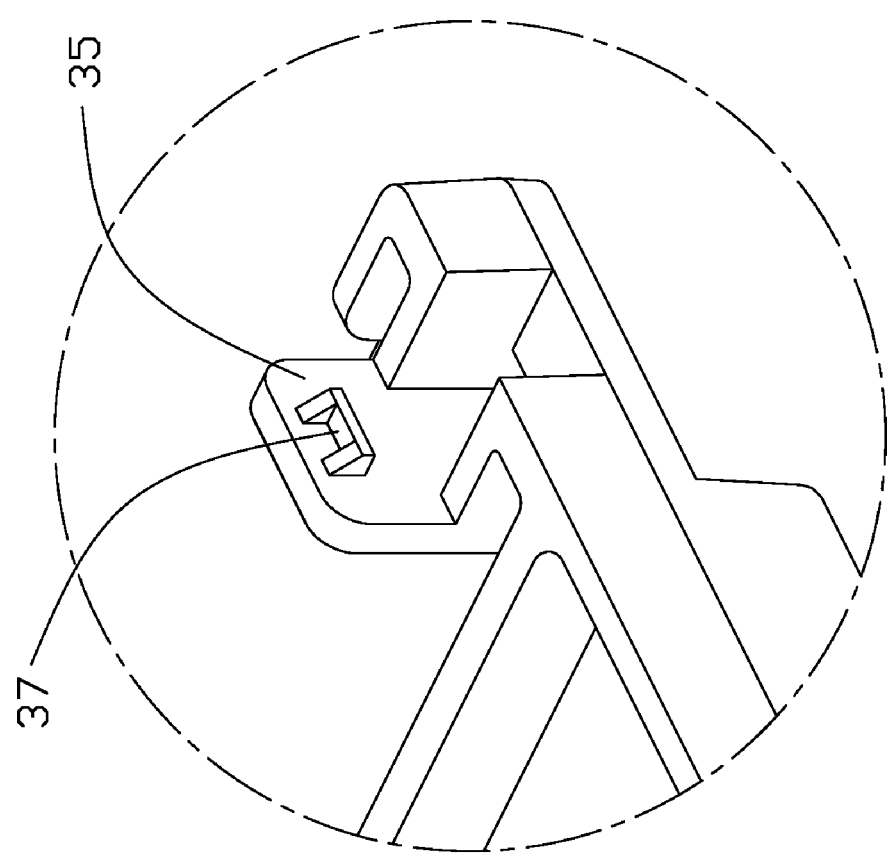
FIG. 4 is an enlarged isometric view of circled region IV in FIG. 2.

Referring also to FIG. 4, the chassis 30 includes a bottom wall 31, and two sidewalls 32 extending substantially perpendicularly from opposite sides of the bottom wall 31. A pair of receiving slots 33 is defined in one sidewall 32 adjacent to the airflow-guiding device 10. An elastic receiving portion 36 extends from the one sidewall 32 around each receiving slot 33. A plate 34 is positioned adjacent to the airflow-guiding device 10 in the chassis 30. A pair of second securing member 35 extends from two sides of the plate 34. An inserting portion 37 extends from each second securing member 35.

Figure 5:
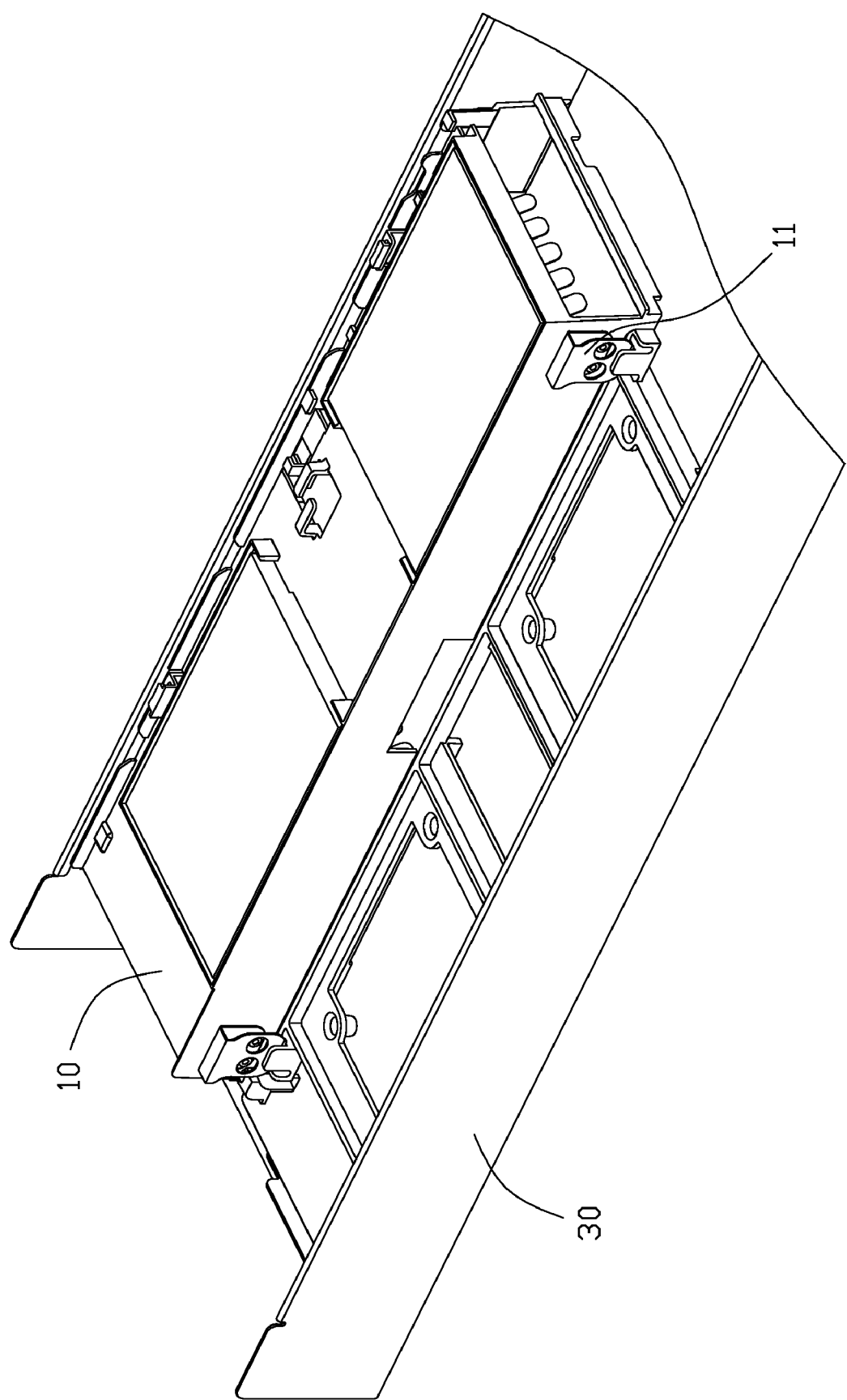
FIG. 5 is an assembled isometric view of the computer enclosure with the airflow-guiding device of FIG. 1.
Figure 6:
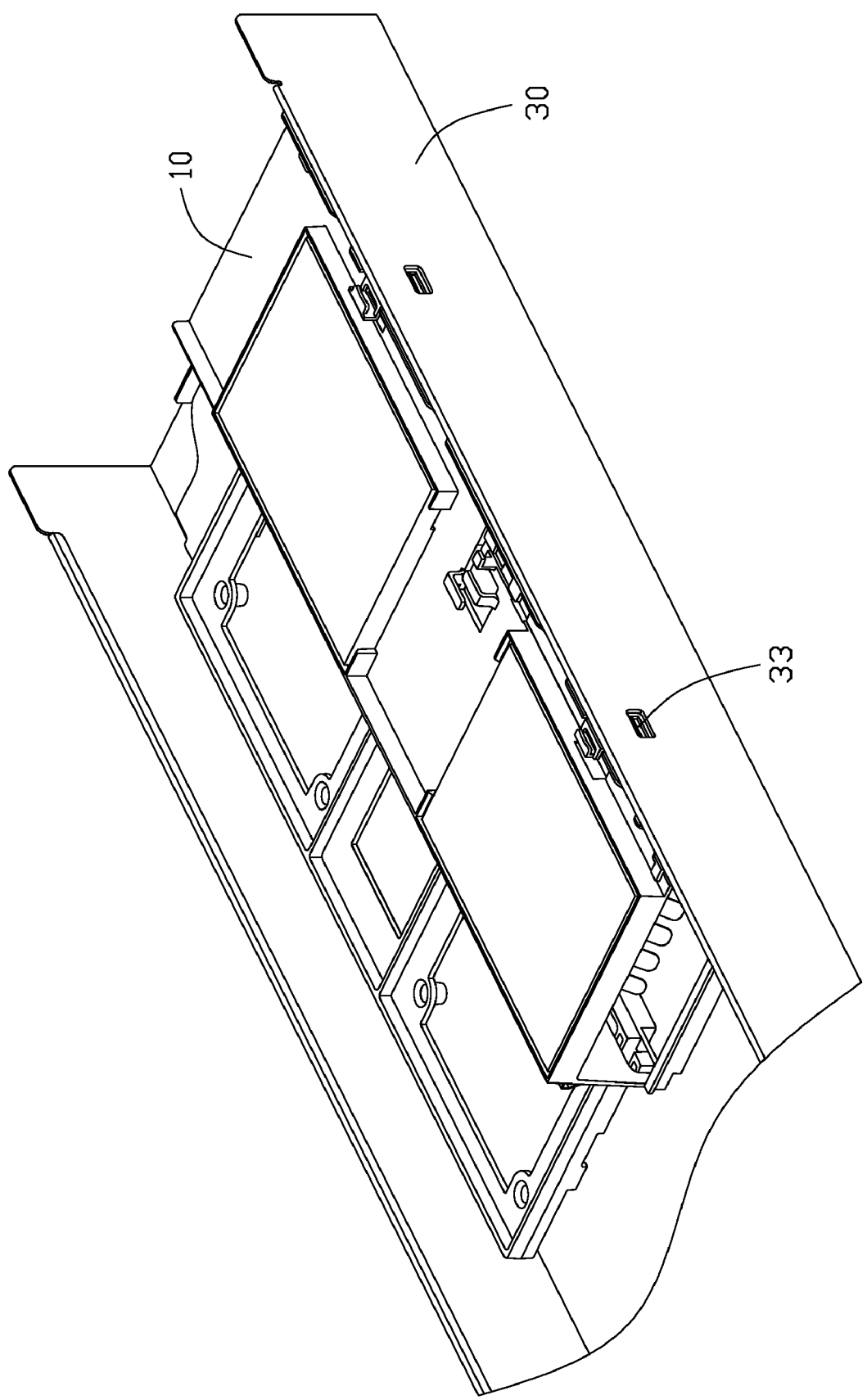
FIG. 6 is similar to FIG. 5, but viewed from another aspect.

Referring also to FIG. 5 and FIG. 6, when the airflow-guiding device 10 is mounted in the chassis 30, the first securing member 13 is aligned with the receiving slot 33. The clip 11 is aligned with the second securing member 35. The wedge 14 of the first securing member 13 resists against the receiving portion 36. The receiving portion 36 urges the wedge 14 so that the first securing member 13 is kept away from the receiving portion 36. Simultaneously, the airflow-guiding device 10 is urged into the chassis 30. The wedge 14 is inserted into the receiving slot 33 and the receiving portion 36 clasps the wedge 14 to mount one side of the airflow-guiding device 10 on the one sidewall 32. The receiving portion 36 is configured to dampen vibration when the airflow-guiding device 10 receives a shock through the chassis 30. The inserting portion 37 is inserted into the hole 12 of the clip 11 to mount the airflow-guiding device 10 in the chassis 30.

When the airflow-guiding device 10 is detached from the chassis 30, the handle 16 of the first securing member 13 is urged away from the wedge 14, thereby disengaging the wedge 14 from the receiving slot 33. The inserting portion 37 is then moved out from the hole 12 of the clip 11, so that the airflow-guiding device 10 can be removed from the chassis 30.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. A computer enclosure, comprising: a chassis, wherein a receiving slot is defined in the chassis, and an elastic receiving portion extends from the chassis around the receiving slot; and an airflow-guiding device mounted to the chassis, wherein a first side of the airflow-guiding device is detachably fixed on the chassis; a first resilient securing member extends from a second side of the airflow-guiding device; a wedge extends from the first securing member to slide over the receiving portion and insert into the receiving slot, wherein a clip extends from the first side of the airflow-guiding device; a second securing member extends from the chassis corresponding to the clip.

2. The computer enclosure of claim 1, wherein the clip is bent approximately 180 degrees back upon itself from the first side of the airflow-guiding device.

3. The computer enclosure of claim 2, wherein a hole is defined in a bottom portion of the clip; an inserting portion extends from the second securing member to insert into the hole.

4. The computer enclosure of claim 1, wherein a handle is formed on the first securing member to disengage the wedge from the receiving slot.

5. The computer enclosure of claim 1, wherein the chassis comprises a bottom wall and two sidewalls substantially perpendicularly extending from the bottom wall; the receiving slot is defined in a first sidewall of the sidewalls of the chassis.

6. The computer enclosure of claim 5, wherein the receiving portion extends from the first sidewall of the sidewalls of the chassis to sandwich the wedge.

7. A computer enclosure, comprising:
a chassis, wherein a second securing member extends from the chassis, and an inserting portion extends from the second securing member; and
an airflow-guiding device detachably mounted in the chassis, wherein a clip is bent approximately 180 degrees back upon itself from a first side of the airflow-guiding device; a hole is defined in a bottom portion of the clip to receive the inserting portion; a second side of the airflow-guiding device is detachably mounted on the chassis.

8. The computer enclosure of claim 7, wherein a first resilient securing member extends from the second side of the airflow-guiding device; a wedge extends from a middle portion of the first securing member; a receiving slot is defined in the chassis to receive the wedge.

9. The computer enclosure of claim 8, wherein an elastic receiving portion extends from the chassis around the receiving slot; the wedge is slid over the receiving portion and inserted into the receiving slot.

10. The computer enclosure of claim 8, wherein the chassis comprises a bottom wall and two sidewalls substantially perpendicularly extending upwards from the bottom wall; the receiving slot is defined in a first sidewall of the sidewalls.

11. The computer enclosure of claim 10, wherein the receiving portion is protruded from the first sidewall of the sidewalls of the chassis to sandwich the wedge.

12. The computer enclosure of claim 8, wherein a handle is formed on a top of the first securing member to disengage the wedge from the receiving slot.

* * * * *